United States Patent [19]

Jansen et al.

[11] Patent Number: 4,798,447

[45] Date of Patent: Jan. 17, 1989

[54] LENS MOUNTING FOR AN ELECTRODYNAMIC DEVICE FOR RECORDING ON AND/OR SCANNING OPTICAL DISCS BY MEANS OF A RADIATION SPOT, AND METHOD OF MANUFACTURING SUCH A LENS MOUNTING

[75] Inventors: Gerardus L. M. Jansen; Henricus J. Smulders, both of Eindhoven, Netherlands

[73] Assignee: U.S. Philips Corporation, New York, N.Y.

[21] Appl. No.: 53,602

[22] Filed: May 20, 1987

Related U.S. Application Data

[63] Continuation of Ser. No. 666,024, Oct. 29, 1984, abandoned.

[30] Foreign Application Priority Data

Sep. 12, 1984 [NL] Netherlands ............... 8402777

[51] Int. Cl.⁴ .................................................. G02B 7/02
[52] U.S. Cl. ..................................... 350/255; 264/251; 350/320; 350/417; 369/44; 369/45; 425/125
[58] Field of Search ............... 264/1.1, 252, 2.4, 242, 264/251, 271.1; 350/167, 417, 247, 255, 320; 369/44-45; 425/588, DIG.59, DIG.107, 127, 247, 121

[56] References Cited

U.S. PATENT DOCUMENTS

| | | | |
|---|---|---|---|
| 2,288,899 | 7/1942 | Gits | 425/121 |
| 3,334,409 | 8/1967 | Shneider et al. | 264/251 |
| 3,476,851 | 11/1969 | Camossi | 264/251 |
| 3,542,328 | 11/1970 | Deitrick | 425/588 |
| 4,154,506 | 5/1979 | Yevick | 350/167 |
| 4,443,721 | 4/1984 | Jansen | 369/44 |
| 4,472,024 | 9/1984 | Konomura | 350/247 |
| 4,504,935 | 3/1985 | Jansen | 369/45 |

FOREIGN PATENT DOCUMENTS

| | | | |
|---|---|---|---|
| 538324 | 7/1941 | United Kingdom | 350/252 |
| 22246 | 2/1977 | Japan | 350/320 |
| 65761 | 5/1979 | Japan | 264/242 |
| 168609 | 12/1981 | Japan | 350/252 |
| 94706 | 6/1982 | Japan | 350/417 |

OTHER PUBLICATIONS

Rubin, I. I., "Injection Moulding Theory & Practice", John Wiley & Sons, 1972, pp. 142-147, 446-448.
Smirnov et al., "Experience in Injection Moulding of Lenses From Polymethylmethacrylate", Sov. Jr. Optical Technology, 2-1972, pp. 94-97.

*Primary Examiner*—John K Corbin
*Assistant Examiner*—Martin Lerner
*Attorney, Agent, or Firm*—F. Brice Faller

[57] ABSTRACT

The invention relates to a lens mounting (11) for an electrodynamic device for recording and/or reading information in and/or from optically readable discs, which device comprises a frame with supporting means for guiding the lens mounting. The lens mounting comprises a first part (27) which cooperates with said supporting means and a second part (31) which is movable relative to said first part and which comprises the mount (32) for a lens system for focusing a radiation beam. The lens mounting (11) further comprises connecting means (33A, 33B and 35) which movably connect the first and the second part to each other. Respective opposite ends of the connecting means are embedded in the first part and the second part of the lens mounting by injection molding into a molding which is configured so that the relative position of the first and second parts are defined by the corresponding portions of one molding die.

1 Claim, 3 Drawing Sheets

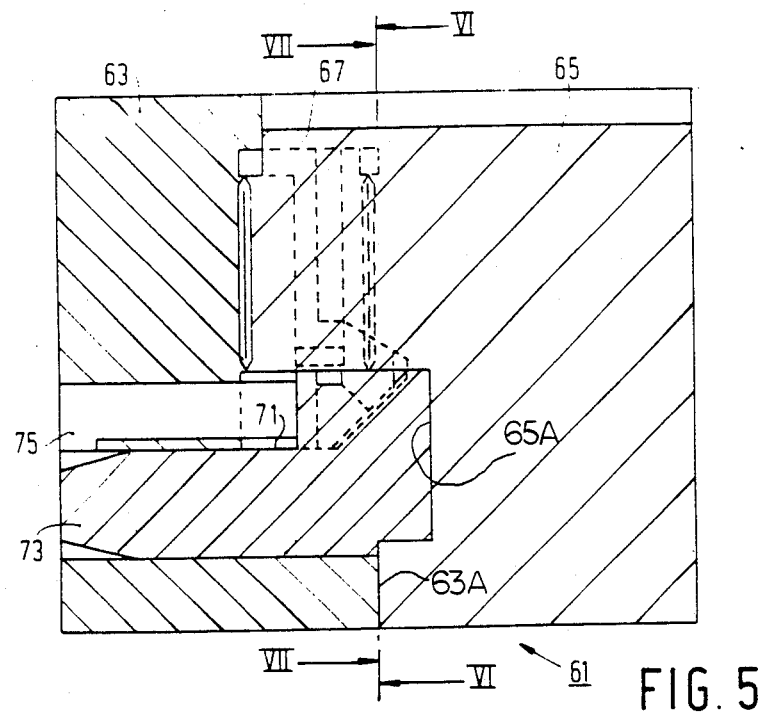
FIG. 5
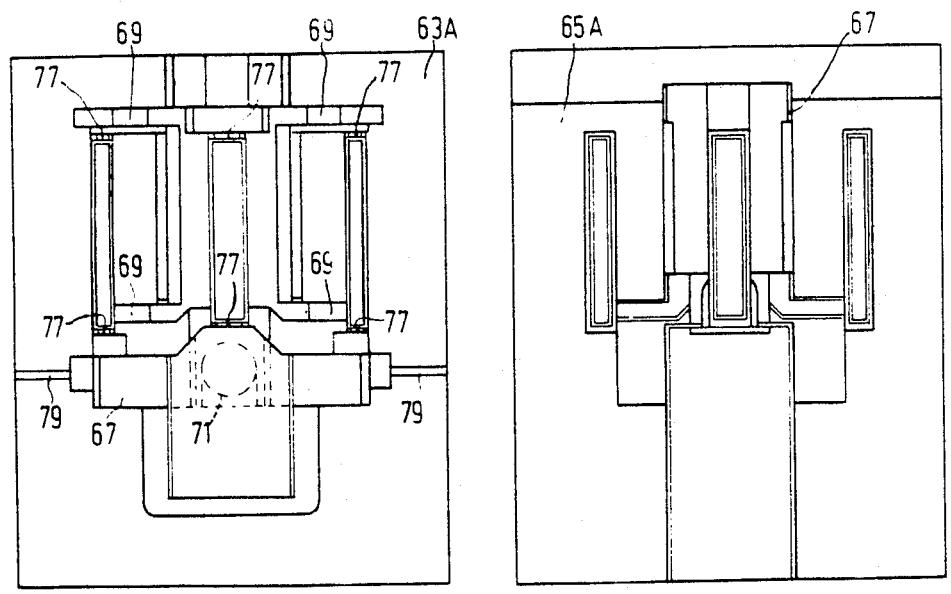
FIG. 6
FIG. 7

LENS MOUNTING FOR AN ELECTRODYNAMIC DEVICE FOR RECORDING ON AND/OR SCANNING OPTICAL DISCS BY MEANS OF A RADIATION SPOT, AND METHOD OF MANUFACTURING SUCH A LENS MOUNTING

This is a continuation of application Ser. No. 666,024, filed Oct. 29, 1984, now abandoned.

BACKGROUND OF THE INVENTION

The invention relates to a movable lens mounting for an electrodynamic device for recording on and/or scanning optical discs by means of a radiation spot, i.e., a focused beam of electromagnetic radiation. The device comprises a frame with supporting means for guiding the, which lens mounting comprises a first part which cooperates with said supporting means and a second part which is movable relative to the first part and which comprises a mount for a lens system for focusing the radiation beam. Connecting means movably connect the first part and the second part to each other.

The invention also relates to a method of manufacturing a movable lens mounting for an electrodynamic device as described above.

Such a lens mounting and method of manufacturing a lens mounting are disclosed in Netherlands patent application 8204981 to which U.S. Pat. No. 4,443,721 corresponds.

The known lens mounting is used in an electrodynamic device in which the lens system is translated along a radial path relative to an optically readable disc which is rotatable about an axis of rotation. The supporting means of the frame comprise two guide rods along which the lens mounting can be translated by means of sleeve bearings arranged on the first part of the lens mounting. The frame also comprises two stator magnets which extend parallel to the guide rods, two actuator coils being arranged on the first part of the lens mounting in the field of these magnets. The second part of the lens mounting carries the lens system, the optical axis of which extends transversely of the optically readable disc. The second part of the lens mounting together with the lens system mounted thereon is movable relative to the first part of the lens mounting along the optical axis. The aforesaid translation of the lens mounting relative to the disc and the movement of the second part of the lens mounting along the optical axis are necessary to enable the movements of the optical disc to be followed with a radiation beam focused into a radiation spot by the lens system.

In the known construction of a lens mounting the second part thereof is movably mounted relative to the first part by means of two pairs of blade springs which are secured to the first and second parts of the lens mounting the means of bolts. Actuator coils are arranged on opposite sides of the second part to cooperate with the stator magnets to provide electrodynamic driving of the second part of the lens mounting along the optical axis of the lens system.

During the manufacture of a lens system of the type described above it is essential that the two parts of the lens mounting are positioned accurately relative to each other in order to ensure that the optical axis of the lens system of the lens mounting, when incorporated in an electrodynamic device, is perpendicular to the recording surface of the optical disc. A misalignment may result in an oblique position of the optical axis of the lens system relative to the recording surface of the optical disc, which causes a change in the light spot which is imaged on the recording (or scanning) surface of the disc. During manufacture of the lens mounting it is therefore necessary to position the second part accurately relative to the first part, after which the two parts are secured to each other by means of bolts. Particularly if large quantities of lens mountings are to be manufactured, these positioning operations, which are labor intensive, incur increased costs of manufacture.

The invention aims at providing a lens mounting and a method of the kind described above, which do not have the noted disadvantages of the previously known constructions.

SUMMARY OF THE INVENTION

According to the present invention the lens mounting is characterized in that the connecting means are embedded in the first and the second part of the lens mounting by injection molding so that the first and second parts are positioned relative to each other by the corresponding portions of the molding die.

An advantage of the lens mounting in accordance with the invention is that the first part and the second part of the lens mounting are positioned relative to each other in a simple and reproducible manner. Moreover, in comparison with the known lens mounting the novel lens mounting of the present invention is substantially less expensive to manufacture, mainly due to the smaller number of operations which must be carried out during its manufacture of.

A suitable embodiment of the invention is characterized in that the connecting means comprise at least two parallel blade springs which are situated at different levels relative to each other, said blade springs being embedded in the first part of the lens mounting at one end and in the second part of said mounting at the other end. By thus arranging the blade springs, which is known per se, and securing the blade springs through injection-molding a suitable displacement of the lens mounting along the optical axis of the lens system is possible without friction and lost motion.

A further suitable embodiment is characterized in that portions of the blade springs which are situated between and at some distance from the first and the second part are encapsulated in a plastic material, i.e., an organic polymeric material.

In this embodiment the stiffness of the blade springs in their axial directions and hence the stiffness of the lens mounting in its direction of translation i.e., in a radial direction relative to the optically readable disc have substantially increased without significantly changing the elasticity of the blade springs in their transverse direction. Such increased stiffness has the advantage that the lens mounting is deformed to a lesser extent when forces are transmitted between the first and the second part, which leads to an increased bandwidth of the control loop for the lens system and consequently to an improved dynamic performance of the device.

The method in accordance with one embodiment of the invention is characterized in that it comprises the following steps:

(1) the manufacture of a molding which comprises a first and second of disc and is provided with molding portions for molding the first part and the second part of the lens mounting, and provisions for supporting the connecting means, the molding portions for moulding the portions of the first part which cooperate with the supporting means and for molding the lens mount in the second part of the lens mounting being located in one die, (2) arranging the connecting means in the molding die, and (3) closing the mold and subsequently manufacturing the lens mounting and simultaneously embedding the connecting means therein by injecting a thermosetting material into the mold.

In the method in accordance with the invention the position of the first part and the second part of the lens mounting relative to each other is defined entirely by the relevant molding portions in the mold. An advantage of this is that during injection of the thermosetting material into the mold the first part and the second part of the lens mounting are formed and connected to each other in an accurately defined position relative to each other, in particular the portion of the first part of the lens mounting and that portion of the second part which constitutes the lens mount occupying an exact position relative to each other without any additional operations being required.

The method in accordance with the invention is very suitable for mechanization, enabling economical volume production of lens mountings of accurate dimensions by means of one accurately manufactured mold.

Suitably, the method is characterized in that the connecting means comprise at least two blade springs which are arranged parallel to each other and at different levels in the mold, after which during the injection of the thermosetting material into the mold one end of each of the blade springs is embedded in the first part and the other end in the second part.

The blade springs can be supported in the mold by wall portions of the mold which thus constitute the supporting provisions.

BRIEF DESCRIPTION OF THE DRAWINGS

The invention will now be described in more detail, by way of example, with reference to the drawings, in which:

FIG. 5 is a sectional view of a mold for the manufacture of the lens mounting shown in the preceding Figures, FIG. 6 is a sectional view taken on the lines VI—VI in FIG. 5, and FIG. 7 is a sectional view taken on the lines VII—VII in FIG. 5.

DETAILED DESCRIPTION OF THE PREFERRED EMBODIMENTS

Figure 1:
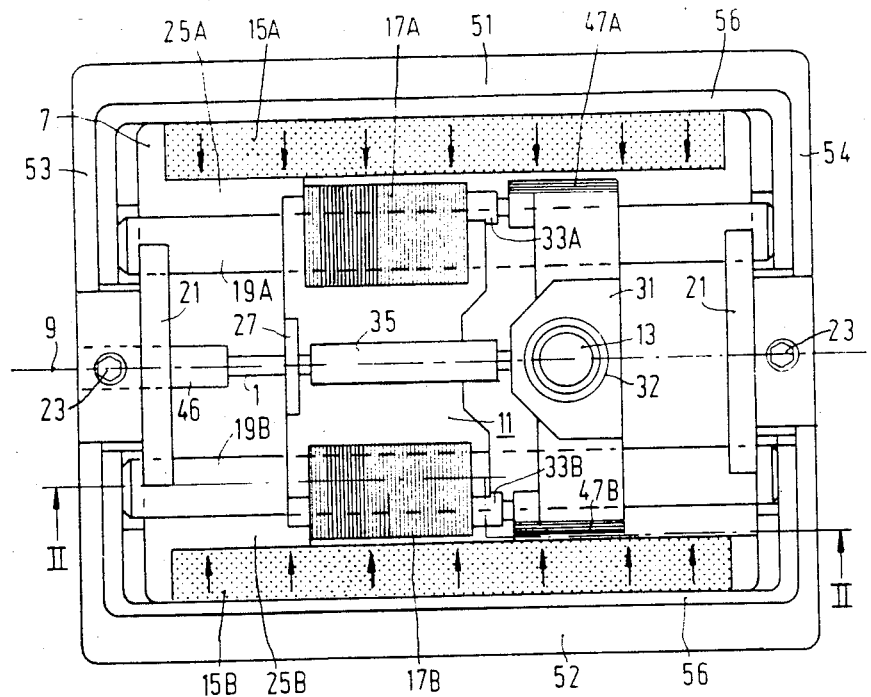
FIG. 1 is a plan view of an embodiment of the invention, incorporated in an electrodynamic device, shown schematically.
Figure 2:
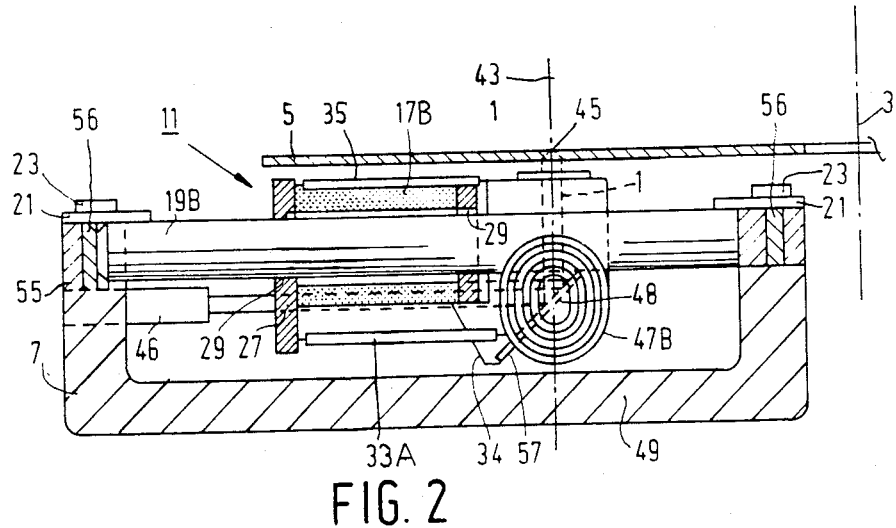
FIG. 2 shows the electrodynamic device provided with an optically readable disc in a side sectional view taken on the lines II—II in FIG. 1.

The electrodynamic device shown in FIGS. 1 and 2 serves for recording and/or reading information by means of a radiation beam 1 in and/or from an information surface of an optical disc 5 which rotates about an axis of rotation 3. The device comprises a frame 7 and a lens mounting 11 which can be translated relative to the frame along a rectilinear path 9 and which carries a lens system 13 comprising at least one lens. The frame 7 carries two permanent stator magnets 15A and 15B, which extend parallel to the path 9 and which are magnetized transversely to said path in a direction indicated by arrows. Two actuator coils 17A and 17B of an electrically conductive material can be translated in the magnetic field of the stator magnets 15A and 15B.

The frame 7 carries bearing or support means for the lens mounting 11 in the form of two guide rods 19A and 19B whose free ends are secured to the frame 7 by means of members 21 and bolts 23. The guide rods 19A and 19B form part of a stator yoke with an air gap 25A between the stator magnet 15A and the rod 19A and an air gap 25B between the magnet 15B and the rod 19B. The actuator coils 17A and 17B are arranged around the guide rods 19A and 19B, respectively.

Figure 3:
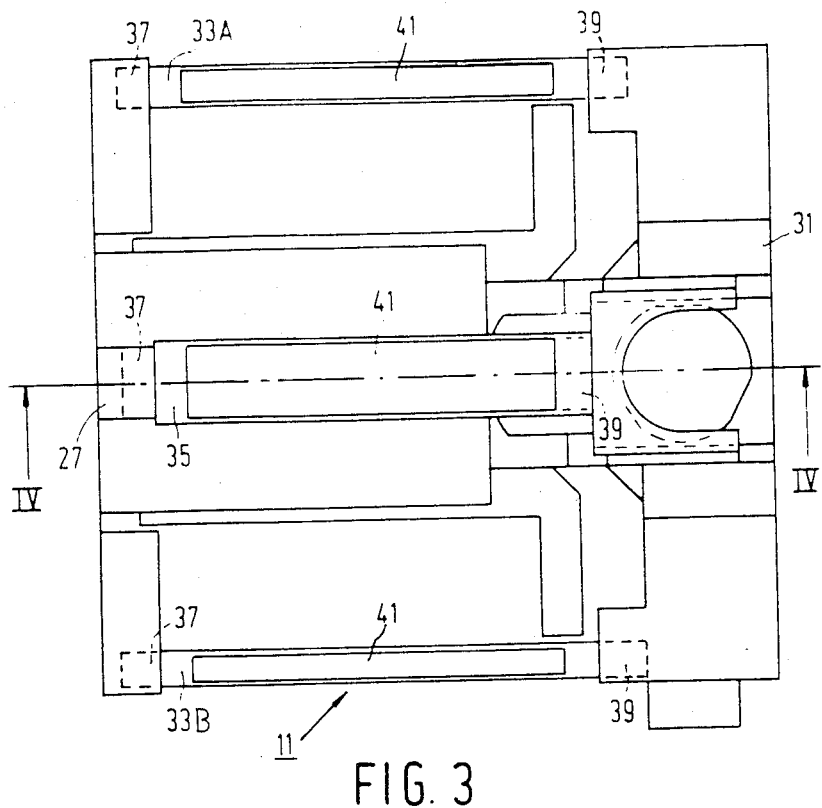
FIG. 3 is a bottom view of the lens mounting shown in FIG. 1.
Figure 4:
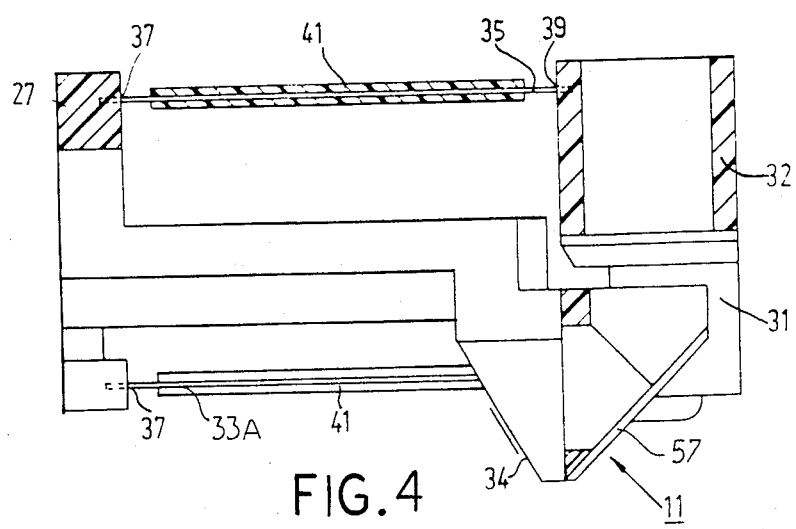
FIG. 4 is a side sectional view taken on the lines IV—IV in FIG. 3.

The lens mounting 11 (see also FIGS. 3 and 4) comprises a first part 27 to which the coils 17A and 17B are secured and which comprises supporting surfaces 29 which cooperate with the guide rods 19A and 19B. The first part 27 has a member 34 having a surface inclined at a 45 degree angle to the path 9 for mounting a reflecting element 57 thereon. The lens mounting further comprises a second part 31 comprising a lens mount 32 for the lens system 13. The second part 31 is movably connected to the first part 27 by connecting means comprising three blade springs 33A, 33B and 35. The blade spring 35 is situated at the upper side of the lens mounting 11 and extends parallel to two adjacently arranged blade springs 33A and 33B which are situated at the lower side of the lens mounting 11. The ends 37 and 39 of the blade springs 33A, 33B and 35 are embedded in the first part 27 and the second part 31, respectively of the lens mounting 11. In order to increase the axial stiffness of the blade springs 33A, 33B and 35 a part 41 of their length has been coated with a plastic material.

The lens system 13 is secured to the second part 31 of the lens mounting 11 and is movable along its optical axis 43 and perpendicular to the path 9 in order to enable the movements of the information disc 5 to be followed with a radiation spot 45 formed by the radiation beam 1 produced by a suitable radiation source 46, shown schematically in the drawings. The blade springs 33A, 33B and 35 allow a limited displacement of the second part 31 along the optical axis 43. The second part 31 of the lens mounting 11 is driven by two actuator coils 47A and 47B which are secured to projections 48 formed for this purpose on opposite sides of the lens mounting. The upper parts of the actuator coils 47A and 47B are movable in said air gaps 25A and 25B, so that the actuator coils 47A and 47B cooperate with the field of the stator magnets 15A and 15B to subject the lens system 13 to forces which are directed along the optical axis 43.

The frame 7 is shaped substantially as an open box with a bottom 49 and upright walls 51, 52, 53 and 54. The upright walls may be made of aluminium or a plastic material and are interconnected at the corners. The stator magnets 15A and 15B are secured to the inner sides of the walls 51 and 52, for example by means of a suitable adhesive. The magnetic lines of force of the magnets 15A and 15B extend through the air gaps 25A and 25B towards the guide rods 19A and 19B and the path for the magnetic flux is closed by ferromagnetic strips 56 which are secured to the inner sides of the walls 51, 52, 53 and 54.

The wall 53 has an opening 55 (FIG. 2) for securing the housing of the radiation source 46. The beam 1 which issues from the radiation source 46 is reflected at an angle of 90° by a reflecting element 57 which is mounted on the member 34 at the underside of the lens mounting 11. The connecting wires to the coils, the other electrical connections and the means necessary for detecting the position of the lens system are not shown for the sake of simplicity, because they are irrelevant to the present invention.

The method in accordance with the invention will now be described in more detail with reference to FIGS. 5, 6 and 7. By means of this method the lens mounting 11 or a similar lens mounting is manufactured in a multi-section moulding die 61. The mold 61 in principle comprises two separable dies, in the illustrated example the first die 63 and the second die 65. The faces 63A and 65A of the dies 63 and 65, respectively are formed with a plurality of molding portions which, when the mold 61 is closed, enclose a cavities whose contours 67 (partly indicated by broken lines) correspond to those parts of the lens mounting to be formed. In order to guarantee an exact position of those parts of the lens mounting which engages the supporting means of the device, in particular the supporting surfaces 29, relative to the position of the optical axis 43 as defined by the actual lens mount of the lens mounting 11 and the position of the reflecting surface 57, the molding portions 69 and second molding portion 71 for moulding the supporting surfaces 29 and the lens mount 11, respectively, are arranged in the same die 63.

For reasons of production engineering the dies 63 and 65 comprise a plurality of parts but, for example, only shows that the die section 63 comprises an insert 73 and a pin 75.

The die 63 comprises a plurality of supporting surfaces 77 for supporting the ends of the blade springs to be embedded, respectively, within the first and second parts of the lens mounting. When the mold 61 is open, three blade springs are arranged on supporting surfaces 77, after which the mold is closed by moving the dies 63 and 65 towards one another. The die mold is now ready for molding a lens mounting 11 in accordance with the invention. For this purpose a thermosetting material, for example phenolic resin with 30% of fiberglass and 10% of graphite, is injected into the molding cavities via sprues 79, the lens mounting with embedded and encapsulated blade springs being formed as the cavity is filled. The first and second parts so molded are connected only by the blade springs.

What is claimed is:

1. A method of manufacturing a movable lens mounting for an electrodynamic device for recording and/or scanning optically readable discs by means of a radiation spot, the device comprising a frame having supporting means for guiding movement of the lens on a rectilinear path, the lens mounting comprising a first part having supporting surfaces which engage the supporting means, a second part having a mount for a lens system for focusing a radiation beam to form the radiation spot, and blade springs which connect the first and second parts so that the second part can move relative to the first part along the optical axis of the lens and perpendicular to said rectilinear path, each spring having opposite ends fixedly embedded in respective first and second parts, the method comprising the steps of:

providing a mold comprising first and second dies, said first die having first molding portions for molding the supporting surfaces of the first part which engage the supporting means and a second molding portion for molding the lens mount of the second part, arranging the blade springs in the mold, said mold, when closed, forming discrete cavities connected only by said springs, closing the mold and injecting a thermosetting material into the cavities to form the first and second parts connected only by said springs.

* * * * *